United States Patent
Yoshida (10) Patent No.: US 10,043,268 B2
(45) Date of Patent: Aug. 7, 2018

(54) MEDICAL IMAGE PROCESSING APPARATUS AND METHOD TO GENERATE AND DISPLAY THIRD PARAMETERS BASED ON FIRST AND SECOND IMAGES

(71) Applicant: Toshiba Medical Systems Corporation, Otawara-shi (JP)

(72) Inventor: Masaki Yoshida, Yaita (JP)

(73) Assignee: Toshiba Medical Systems Corporation, Otawara-shi (JP)

( * ) Notice: Subject to any disclaimer, the term of this patent is extended or adjusted under 35 U.S.C. 154(b) by 66 days.

(21) Appl. No.: 15/008,180

(22) Filed: Jan. 27, 2016

(65) Prior Publication Data

US 2016/0217585 A1    Jul. 28, 2016

(30) Foreign Application Priority Data

Jan. 27, 2015   (JP) .................................. 2015-013179

(51) Int. Cl.
  *G06T 7/00*   (2017.01)
  *A61B 6/03*   (2006.01)
  *G06T 5/50*   (2006.01)

(52) U.S. Cl.
  CPC .............. *G06T 7/0012* (2013.01); *G06T 5/50* (2013.01); *G06T 2207/10081* (2013.01);
  (Continued)

(58) Field of Classification Search
  CPC . G06T 2207/10081; G06T 2207/10104; G06T 2207/20221; G06T 2207/10084;
  (Continued)

(56) References Cited

U.S. PATENT DOCUMENTS 5,319,549 A * 6/1994 Katsuragawa ........ G06T 7/0012
  382/108
5,740,801 A * 4/1998 Branson ................ G06F 19/321
  128/920

(Continued)

FOREIGN PATENT DOCUMENTS

JP    2004-216007    8/2004
JP    2006-198060    8/2006
(Continued)

OTHER PUBLICATIONS

Zhu, Yang-Ming, and Charles A. Nortmann. "Pixel-feature hybrid fusion for PET/CT images." Journal of digital imaging 24.1 (2011): 50-57.*

*Primary Examiner* — Vincent Rudolph
*Assistant Examiner* — Pinalben Patel
(74) *Attorney, Agent, or Firm* — Oblon, McClelland, Maier & Neustadt, L.L.P.

(57) ABSTRACT

According to an embodiment, a medical image processing apparatus includes a storage, processing circuitry and a display. The storage stores a first image obtained by capturing a target region of a subject and a second image obtained by capturing the target region. The circuitry is configured to modify a first parameter of each of pixels of the first image based on a second parameter of each corresponding pixel of the second image and a function of the second parameter to generate a third parameter. The display displays a display image based on the third parameter which the processing circuitry determines for each of the pixels.

13 Claims, 6 Drawing Sheets

(52) U.S. Cl.
CPC ............... *G06T 2207/10084* (2013.01); *G06T 2207/10104* (2013.01); *G06T 2207/20221* (2013.01); *G06T 2207/30004* (2013.01)

(58) Field of Classification Search
CPC ............................. G06T 5/50; G06T 7/0012; G06T 2207/30004
See application file for complete search history.

(56) References Cited

U.S. PATENT DOCUMENTS

| | | | | |
|---|---|---|---|---|
| 2003/0086002 | A1* | 5/2003 | Cahill | G06T 5/009 348/218.1 |
| 2009/0080749 | A1* | 3/2009 | Visser | G06T 3/4007 382/131 |
| 2010/0054630 | A1* | 3/2010 | Avinash | G06F 3/04845 382/294 |
| 2010/0158336 | A1 | 6/2010 | Motomura et al. | |
| 2010/0284582 | A1* | 11/2010 | Petit | G06T 7/0012 382/128 |
| 2011/0019910 | A1* | 1/2011 | Kameyama | G06T 5/50 382/163 |
| 2012/0179021 | A1* | 7/2012 | Blevis | A61B 6/037 600/407 |
| 2014/0037160 | A1* | 2/2014 | Matsuzaki | G06T 7/0012 382/128 |
| 2014/0161338 | A1* | 6/2014 | MacHado | A61B 5/0042 382/131 |
| 2016/0225147 | A1* | 8/2016 | Boroczky | A61B 6/032 |
| 2016/0343114 | A1* | 11/2016 | Lin | G06T 5/002 |
| 2018/0061111 | A1* | 3/2018 | Engel | G06T 15/06 |

FOREIGN PATENT DOCUMENTS

| | | |
|---|---|---|
| JP | 2010-167261 | 8/2010 |
| JP | 2010-181859 | 8/2010 |
| JP | 2011-98191 | 5/2011 |
| JP | 5062477 | 10/2012 |
| JP | 5232286 | 7/2013 |
| JP | 5484788 | 5/2014 |
| JP | 5523427 | 6/2014 |

* cited by examiner

MEDICAL IMAGE PROCESSING APPARATUS AND METHOD TO GENERATE AND DISPLAY THIRD PARAMETERS BASED ON FIRST AND SECOND IMAGES

CROSS-REFERENCE TO RELATED APPLICATIONS

This application is based upon and claims the benefit of priority from the Japanese Patent Application No. 2015-013179, filed Jan. 27, 2015, the entire contents of which are incorporated herein by reference.

FIELD

Embodiments described herein relate generally to a medical image processing apparatus, a medical image processing method and a medical image diagnosis apparatus.

BACKGROUND

It is known in the art to form one image by the fusion of a plurality of medical images. For example, a technique for the fusion of a computed tomography (CT) image and a positron emission tomography (PET) image is known in the art. According to this technique, an opacity curve and a color map based on measurements are set for each pixel of the CT image. Similarly, the opacity curve and color map are set for each pixel of the PET image. After this processing, the two images are subjected to fusion.

By the image fusion processing, a medical doctor can obtain both morphologic information of the CT image and functional information of the PET image from one image. According to the image fusion processing, however, a region that does not have to be observed may also be subjected to fusion. For example, an affected region shown in the PET image may overlap a bone region shown in the CT image. In such a fusion image, the information may be congested, and a region of interest (ROI) may not be observed easily.

As described above, a fusion image obtained by the fusion of a plurality of images according to the existing technique may not allow easy interpretation of images.

DETAILED DESCRIPTION

In general, according to one embodiment, a medical image processing apparatus includes a storage, processing circuitry and a display. The storage stores a first image obtained by capturing a target region of a subject and a second image obtained by capturing the target region. The processing circuitry is configured to modify a first parameter of each of pixels of the first image based on a second parameter of each corresponding pixel of the second image and a function of the second parameter to generate a third parameter. The display displays a display image based on the third parameter which the processing circuitry determines for each of the pixels.

In the explanation set forth below, the medical image processing apparatus will be described as being incorporated in the PET/CT apparatus 10. However, the medical image processing apparatus may be incorporated in a modality other than the PET/CT apparatus 10, or may be used independently. In the description below, structural elements having substantially the same functions and configurations will be denoted by the same reference symbols, and a repetitive description will be given only where necessary.

Figure 1:
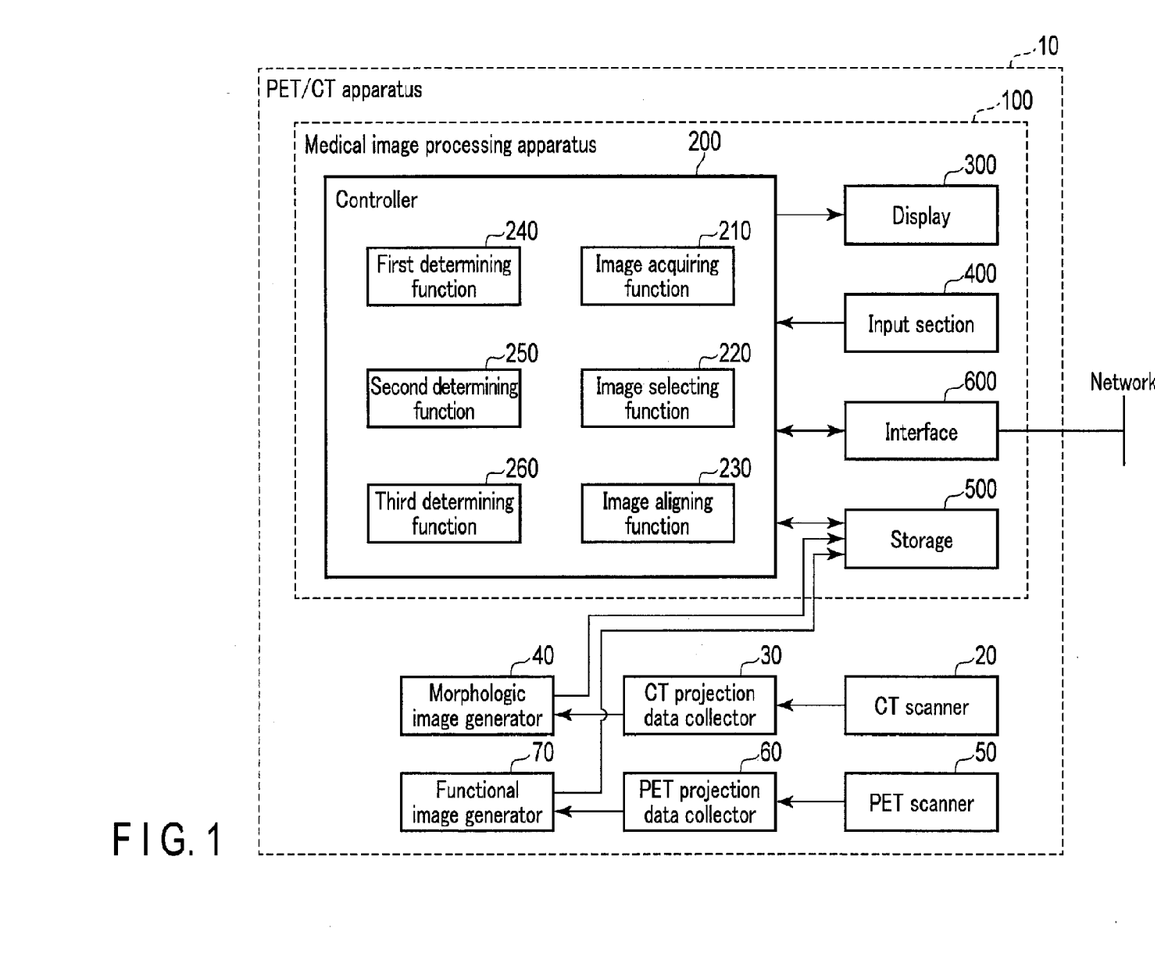
FIG. 1 is a functional block diagram showing an example of a PET/CT apparatus 10 according an embodiment.

FIG. 1 is a functional block diagram showing an example of a PET/CT apparatus 10 according an embodiment. The PET/CT apparatus 10 comprises a medical image processing apparatus 100, a CT scanner 20, a CT projection data collector 30, a morphologic image generator 40, a PET scanner 50, a PET projection data collector 60 and a functional image generator 70.

The CT scanner 20 CT-scans a subject by X-rays. The CT scanner 20 comprises an X-ray tube (not shown) and an X-ray detector (not shown). The X-ray tube and the X-ray detector are arranged to be opposite to each other, with a hollow section (not shown) in which a subject lies being located in between. The X-ray tube generates X-rays. The X-ray detector detects X-rays that have passed through the subject and generates electric signals based on the energy of the detected X-rays. The X-ray generation and the X-ray detection are repeated, with the X-ray tube and the X-ray detector being rotated around the hollow section.

The CT projection data collector 30 collects projection data (hereinafter referred to as CT projection data) by performing preprocessing for the electric signals supplied from the CT scanner 20. The preprocessing performed for the generation of the CT projection data includes logarithmic conversion, sensitivity correction, beam hardening correction, etc.

The morphologic image generator 40 generates morphologic images. The morphologic image generator 40 generates CT image data regarding a predetermined reconstructed section, based on the CT projection data. The pixel value of each of the pixels of a CT image reflects a CT value which is based on the X-ray attenuation coefficient (absorption coefficient) of a material existing on an X-ray transmission path. CT images prepared by the morphologic image generator 40 are stored in the storage 500 of the medical image processing apparatus 100.

The PET scanner 50 PET-scans a subject by gamma rays. The PET scanner comprises gamma ray detectors (not shown) annually arranged around the hollow section. The gamma ray detectors repeatedly detect gamma rays emitted from the subject and repeatedly generate electric signals based on the energy of the detected gamma rays.

The PET projection data collector 60 performs signal processing for the electric signals supplied from the PET scanner 50 and generates projection data (hereinafter referred to as PET projection data). The signal processing includes position calculation processing, energy calculation processing, coincidence counting processing and preprocessing. The preprocessing used for the generation of PET projection data includes, for example, sensitivity correction, random correction, scattered radiation correction.

The functional image generator 70 generates functional images. The functional image generator 70 generates PET image data regarding a reconstructed section at substantially the same position as the reconstructed section of the CT image, based on the PET projection data. The pixel value of each of the pixels of a PET image reflects a count value which is based on the concentration of radioactive isotopes. PET images prepared by the functional image generator 70 are stored in the storage 500.

The medical image processing apparatus 100 comprises a controller 200, a display 300, an input section 400, a storage 500 and an interface 600.

The controller 200 includes, for example, a processor, a central processing unit (CPU), a memory and so on.

The display 300 displays various kinds of information such as candidate thresholds. As the display 200, a CRT display, a liquid crystal display, an organic EL display, etc. can be used, as needed.

The input section 400 receives various commands or information which the operator enters by operating an input device. As the input device, a keyboard, a mouse, various kinds of switches may be used.

The storage 500 is, for example, a hard disk drive (HDD), a solid stage drive (SSD), or a storage device such as a semiconductor memory. The storage 500 stores a base image of an object to be displayed, and a sub image showing substantially the same portion as the base image.

In the embodiment, an image which is to be corrected is referred to as a base image. An image used for obtaining data required for the correction processing is referred to as a sub image.

The interface 600 is connected to a picture archiving and communication system (PACS) (not shown) or to another computer, by way of a network. The interface 600 communicates with a communication partner to which it is connected. The typical protocol used for this communication is digital imaging and communications in medicine (DICOM).

The controller 200 comprises an image acquiring function 210, an image selecting function 220, an image aligning function 230, a first determining function 240, a second determining function 250, and a third determining function 260.

The controller 200 functions as an information processing apparatus (a computer) and controls the medical image processing apparatus 100. The controller 200 reads various programs related to control processing from the storage 500. After reading program, the controller 200 has the functions shown in FIG. 1, namely, an image acquiring function 210, an image selecting function 220, an image aligning function 230, a first determining function 240, a second determining function 250 and a third determining function 260. In other words, the controller 200 reads, from the storage 500, programs related to the image acquiring function 210, the image selecting function 220, the image aligning function 230, the first determining function 240, the second determining function 250 and the third determining function 260.

The controller 200 loads the program related to the image acquiring function in its memory, and executes the program to realize the image acquiring function 210. At the time, the controller 200 functions as the image acquiring function 210.

The image acquiring function 210 obtains CT images and PET images of an object from the storage 500.

The controller 200 loads the program related to the image selecting function in its memory, and executes the program to realize the image selecting function 220. At the time, the controller 200 functions as the image selecting function 220.

The image selecting function 220 selects one base image and one or more sub images from among a plurality of images obtained from the storage 500. It should be noted here that an image to be displayed is referred to as a base image. An image used for correcting the base image is referred to as a sub image.

The image selecting function 220 stores the selected images in its memory (not shown). The images may be captured by different modalities or by one modality. The base images used in the present embodiment may be morphological images or functional images. Similarly, the sub images may be morphological images or functional images.

The morphological images are original images created by an X-ray CT apparatus, an X-ray photography apparatus, a magnetic resonance imaging (MRI) apparatus or the like. The morphological images contain morphological information. The morphological information is information representing the shapes of internal organs or bones.

The functional images are original images created by a PET apparatus, a single photon emission computed tomography (SPECT) apparatus or the like. The functional images are images representing functional information and include information on motion parameters of an ROI, such as a cardiac wall motion and an ejection fraction, or blood flow-related parameters of the ROI, such as a blood flow rate, a blood volume, a mean transit time and a wash-out rate. The functional images contain functional information. The functional information is information representing the motion of an internal organ, a blood flow, metabolism, etc. A medical doctor can presume pathological abnormality such as a tumor or cardiac infarction based on the functional information.

Let us assume that the base images of the present embodiment are morphological images and the sub images are functional images. More specifically, let us assume that the base images of the present embodiment are CT images and the sub images are PET images and that the CT images and the PET images are images of the same body portion of a subject. This is merely an example and is not restrictive.

The controller 200 loads the program related to the image aligning function in its memory, and executes the program to realize the image aligning function 230. At the time, the controller 200 functions as the image aligning function 230.

The image aligning function 230 performs positional adjustment between the base images and sub images stored in the memory of the image selecting function 220. An arbitrary algorithm may be used for this positional adjustment.

The controller 200 loads the program related to the first determining function in its memory, and executes the program to realize the first determining function 240. At the time, the controller 200 functions as the first determining function 240.

The first determining function 240 determines a first parameter related to how a base image should be displayed. The first parameter is determined based on the pixel value of each of the pixels of the base image. The parameter related to the display of an image is, for example, opacity or a color value. To simplify the description given below, it is assumed that the parameters of a base image and sub image are opacity and a color value. The first determining function 240 can adjust the parameters related to the image quality of the base image in such a manner that the ROI in the base image can be easily observed.

The controller 200 loads the program related to the second determining function in its memory, and executes the program to realize the second determining function 250. At the time, the controller 200 functions as the second determining function 250.

The second determining function 250 determines a second parameter related to how a sub image should be displayed. The second parameter is determined based on the pixel value of each of the pixels of the sub image. The second determining function 250 can adjust the parameters related to the image quality of the sub image in such a manner that the ROI in the sub image can be easily observed.

The controller 200 loads the program related to the third determining function in its memory, and executes the program to realize the third determining function 260. At the time, the controller 200 functions as the third determining function 260.

The third determining function 260 determines a third parameter related to how a display image should be displayed. The third parameter is determined for each of the pixels of the base image. The third parameter reflects both the pixel values of the pixels of the base image and the pixel values of the pixels of the sub image. The third determining function 260 determines the third parameter based on the first parameter related to the display of the base image and the second parameter related to the display of the sub image. A description will now be given of an operation of the apparatus described above.

Figure 2:
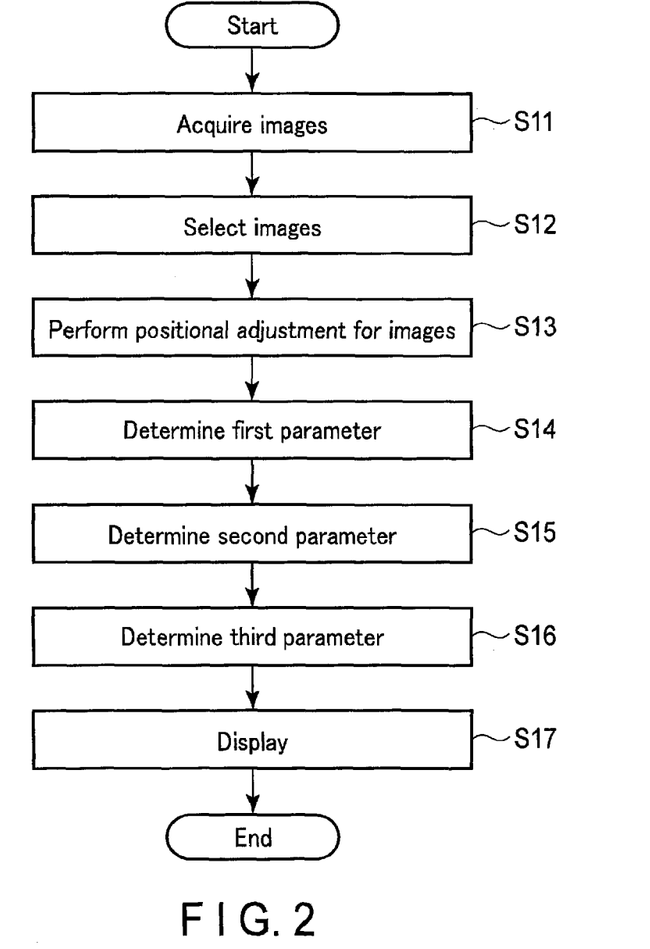
FIG. 2 is a flowchart illustrating an example of a procedure performed by the medical image processing apparatus 100 shown in FIG. 1.

FIG. 2 is a flowchart illustrating an example of a procedure performed by the medical image processing apparatus 100 shown in FIG. 1. In the process mentioned below, it is assumed that the storage 500 stores a series of CT images and a series of PET images in association with each other. The medical image processing described below is performed for the CT image and the PET image which are included in the series of the CT images and PET images and which have the same image capturing date, for example.

Referring to FIG. 2, the controller 200 controls the image acquiring function 210 to acquire, from the storage 500, the CT images and PET images which are captured in time series and are to be processed (Step S11). The CT images and the PET images may be acquired in response to a command which the operator enters from the input section 400.

Then, the controller 200 controls the image selecting function 220 in such a manner as to select one base image (e.g., a CT image) and one sub image (e.g., a PET image) from the CT and PET images acquired in Step S11 (Step S12). Two or more sub images may be selected. The base image and the sub image may be selected in response to a command which the operator enters from the input section 400.

Then, the controller 200 controls the image aligning function 230 to perform positional adjustment between the base image and sub image stored in the memory of the image selecting function 220 (Step S13). In Step S13, the image aligning function 230 performs positional alignment, for example, by associating the base image and the sub image with each other, based on the pixels showing the same anatomical body portion.

Subsequently, the controller 200 controls the first determining function 240 to determine a first parameter related to how the base image should be displayed. The first parameter is determined based on the pixel value of each of the pixels of the base image (Step S14). In Step S14, the first determining function 240 adjusts the display parameters (opacity and color value) of the base image (CT image), which are based on the CT values and the window level/window width, automatically or in response to a manual operation by the operator.

It is assumed that in the image adjusted in image quality, the opacity at the coordinate portion having a CT value of p is defined as $O_{CT}(p)$. The opacity $O_{CT}$ is a value in the range of 0.0 to 1.0. The coordinate portion is completely transparent when the opacity $O_{CT}$ is 0 and is completely opaque when the opacity is 1.0.

It is assumed that in the image adjusted in image quality, the color value at the coordinate portion having a CT value of p is defined as $C_{CT}(p)$. The color value $C_{CT}$ is represented in the RGB notation, and $C_{CT}(p)=(R(C_{CT})\ G(C_{CT})\ B(C_{CT}))$. $R(C_{CT})$ (hereinafter referred to as the R element), $G(C_{CT})$ (hereinafter referred to as the G element) and the $B(C_{CT})$ (hereinafter referred to as the B element) are values in the range of 0 to 255. The first parameter regarding how the base image should be displayed is determined as above.

Subsequently, the controller 200 controls the second determining function 250 to determine a second parameter related to how the sub image should be displayed. The second parameter is determined based on the pixel value of each of the pixels of the sub image (Step S15). In Step S15, the second determining function 250 adjusts the display parameters (opacity and color value) of the sub image (PET image), which are based on the measurements or SUV value and the window level/window width, automatically or in response to a manual operation by the operator.

The PET image has an index referred to as a standardized uptake value (SUV). The SUV can be correlated with the CT value of the CT image. The SUV is an index representing how a radioactive agent is concentrated in an affected portion and is calculated based on the measured PET value.

The opacity at the coordinate portion where the SUV is q is defined as $O_{PET}(q)$. The color value at the coordinate portion where the SUV is q is defined as $C_{PET}(q)$. The second parameter regarding how the sub image should be displayed is determined as above.

Subsequently, the controller 200 controls the third determining function 260 to determine a third parameter related to how the display image should be displayed. The third parameter is determined for each of the pixels of the base image (Step S16). The third parameter reflects both the pixel values of the pixels of the base image and the pixel values of the pixels of the sub image. The third determining function 260 determines the third parameter based on the first parameter related to the display of the base image and the second parameter related to the display of the sub image.

The third determining function 260 determines the third parameters related to the base image in such a manner that the second parameter and the third parameter have a positive correlation. The positive correlation is intended to indicate that there is a similar tendency between the two parameters. That is, if one of them increases, the other also increases. Conversely, if one of them decreases, the other also decreases.

The third determining function 260 determines a third parameter related to how the base image (CT image) should be displayed. The third parameter is determined based on the SUV of the sub image (PET image).

A description will be given as to how the opacity of the third parameter is determined. The opacity $O'_{CT}$ of the CT image subjected to correction processing is denoted by formula 1 set forth below.

$$O'_{CT} = \begin{cases} f & (0 \le f \le 1) \\ 1 & (f > 1) \\ 0 & (f < 0) \end{cases} \quad \text{[formula 1]}$$

where f is a correction function. The correction function f is defined by the CT value p of the CT image, the SUV q of the PET image, and the contribution ratio α of the PET image to the CT image with respect to the opacity. In the present embodiment, the correction function f is defined by either formula (1) or formula (2) below.

$$f(p,q,\alpha) = O_{CT}(p) - \alpha(1 - O_{PET}(q)) \quad (1)$$

$$f(p,q,\alpha) = O_{CT}(p) \cdot \exp\{-\alpha(1 - O_{PET}(q))\} \quad (2)$$

where f is defined in such a manner as to decrease in accordance with a decrease of the value of $O_{PET}$. The contribution ratio α represents how the the opacity $O_{PET}$ of the sub image contributes the opacity in the corrected display image. When the value of α is large, the degree of correction is high. When the value of α is zero, correction is not performed. The maximal value of α is 1. The contribution ratio α can be freely designated as a display parameter by a medical doctor who operates the input section 400.

By displaying $O'^{CT}$ as an image using the correction function f defined by formula (1) or formula (2), the transparent regions of the PET image (i.e., the regions where the opacity is low) are displayed as transparent in the corrected image as well. In other words, the use of the correction function f enables the opacity $O'_{CT}$ of the display image to have a tendency similar to that of $O_{PET}$.

A description will be given as to how the color value (including the R element, G element and B element) of the third parameter is determined. The color value of the base image (CT image) is corrected based on the SUV of the sub image (PET image). When the color value of the CT image subjected to correction processing is $C'_{CT}$, the R element of $C'_{CT}$ is denoted by formula 2 set forth below.

$$R(C'_{CT}) = \begin{cases} g & (0 \le g \le 255) \\ 255 & (g > 255) \\ 0 & (g < 0) \end{cases} \quad \text{[formula 2]}$$

where g is a correction function. The correction function g is defined by the CT value p of the CT image, the SUV q of the PET image, and the contribution ratio β of the PET image to the CT image with respect to the color value. In the present embodiment, the correction function g is defined by either formula (3) or formula (4) below.

$$g(p,q,\beta) = R(C_{CT}(p)) - \beta(255 - R(C_{PET}(q))) \quad (3)$$

$$g(p,q,\beta) = R(C_{CT}(p)) \cdot \exp\{-\beta(255 - R(C_{PET}(q)))\} \quad (4)$$

where g is defined in such a manner as to decrease in accordance with a decrease of the value of $C_{PET}$. The contribution ratio β represents how the the R element of $C_{PET}$ of the sub image contributes the R element in the corrected display image. When the value of β is large, the degree of correction is high. When the value of β is zero, correction is not performed. The maximal value of β is 1. The contribution ratio β can be freely designated as a display parameter by a medical doctor who operates the input section 400.

By displaying $C'_{CT}$ as an image using the correction function g defined by formula (3) or formula (4), the small-R-element regions of the PET image are displayed as small-R-element regions in the corrected image as well. In other words, the use of the correction function g enables the R element of the color value $C'_{CT}$ of the display image to have a tendency similar to that of $C_{PET}$. Similar processing is executed for the G element and B element of $C'_{CT}$.

The controller 200 controls the display 300 to display a base image based on the third parameter (Step S17). In Step S17, the display 300 displays a base image corrected based on the third parameter, namely, a display image. The image displayed on the display 300 mainly uses a CT image having morphological information and yet contains functional information, namely, the SUV distribution of a PET image.

Figure 3:
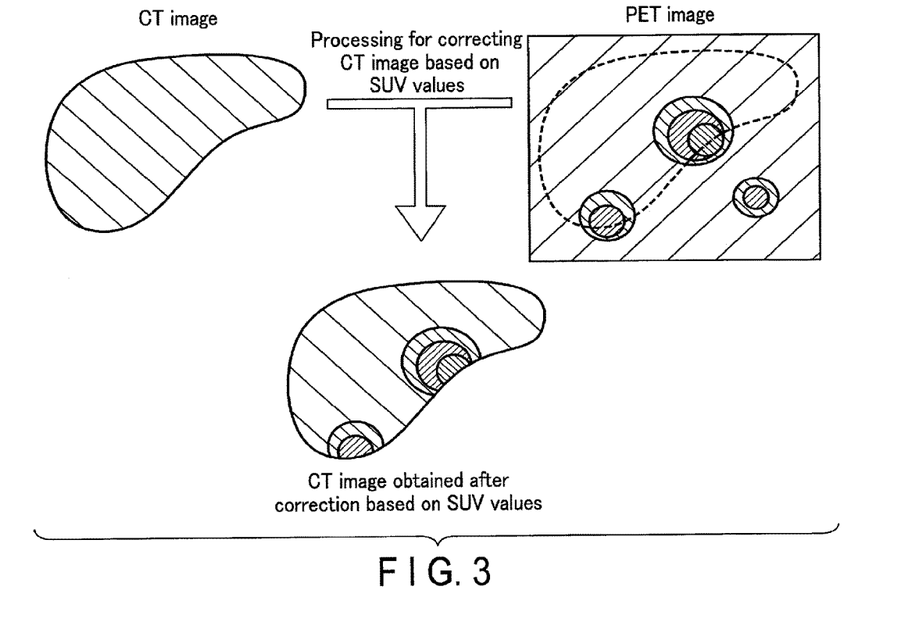
FIG. 3 is an explanatory diagram illustrating an example of processing for correcting a base image (a CT image) by use of a sub image (a PET image)

FIG. 3 is an explanatory diagram illustrating an example of processing for correcting a base image (a CT image) by use of a sub image (a. PET image). The display image mainly shows morphological information of the CT image and yet shows high-SUV regions (i.e., affected portions) of the PET image in an emphasized manner. That is, the display image shown in FIG. 3 reflects both the morphological information and the functional information.

Figure 4:
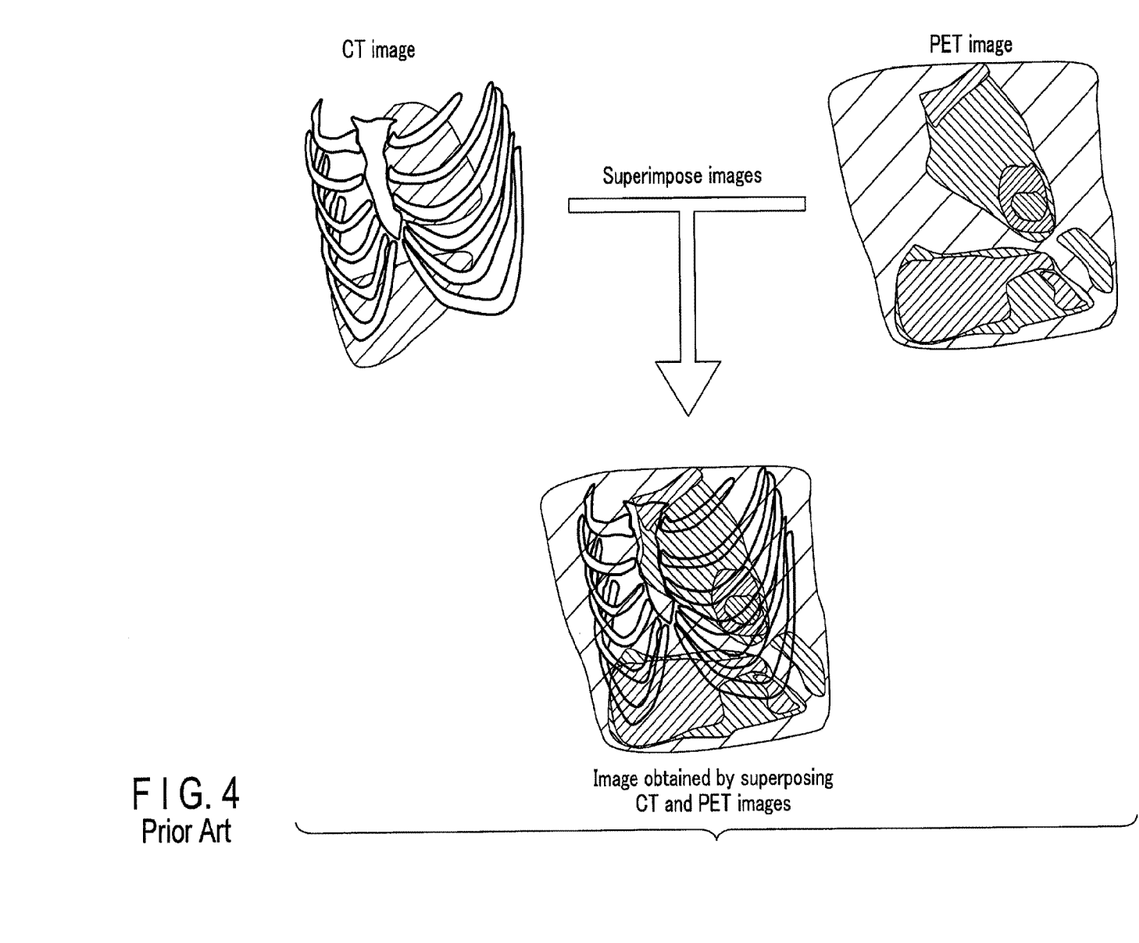
FIG. 4 is a diagram showing, for comparison, an example of a fusion image prepared by the existing technique.

FIG. 4 is a diagram showing, for comparison, an example of a fusion image prepared by the existing technique. According to the existing fusion processing, an opacity distribution (opacity curve) and a color distribution (color map) based on measurements are set for each pixel of a CT image. Similarly, the opacity curve and color map are set for each pixel of a PET image. The two images are superimposed to generate a fusion image.

The existing fusion processing, however, does not involve the correction processing described above. For this reason, the fusion image inevitably includes regions that are not required in the observation. For example, in FIG. 4, the affected regions of the PET image are superimposed on the bone regions of the CT image and are hard to observe due to the congestion of information. That is, according to the existing technique, superimposition is performed for each of the pixels of an image, regardless of whether the pixels are those of a region to be observed. As a result, information is congested in the display image, and the regions to be observed are hard to discriminate from the regions that do not have to be observed. This prevents a medical doctor from accurately interpreting the images in the regions to be observed.

It is known in the art to use the measurements of one of two images for the processing of the other image. For example, an inhibition region that inhibits clear observation of regions to be observed can be identified based on measurements of one of the images, and an image without the inhibition region can be superimposed on the other image. This technique may enable clear observation of the regions to be observed because of the deletion of the inhibition region.

However, this technique removes every image information regarding the deleted region. For this reason, information representing how the measurements vary with time cannot be obtained. In addition, since simple fusion processing is performed in regions other than the inhibition region, the interpretation of an image may be hard due to the congestion of information.

In contrast, the medical image processing apparatus of the present embodiment can correct a base image based on a sub image. In a display image obtained by the correction, the display parameters of the base image (such as the opacity and color value of a CT image) have a tendency similar to those of the sub image (PET image). Furthermore, unlike the fusion image shown in FIG. 4, the fusion image according to the embodiment enables the observation regions to be discriminated from the other regions.

Hence, the embodiment can provide a medical image processing apparatus, a medical image processing method and a medical image diagnosis apparatus capable of creating fusion images that are easy to interpret.

The embodiment described above is not restrictive. In the above-mentioned embodiment, a CT image is used as a base image, and a PET image is used as a sub image. Instead of this, the base image may be a morphological image or a functional image. Similarly, the sub image may be a morphological image or a functional image. In addition, a display image may be superimposed on another image (e.g., a sub image) after being adjusted in position.

Functional images can be generated from a plurality of images of different time phases.

Figure 5:
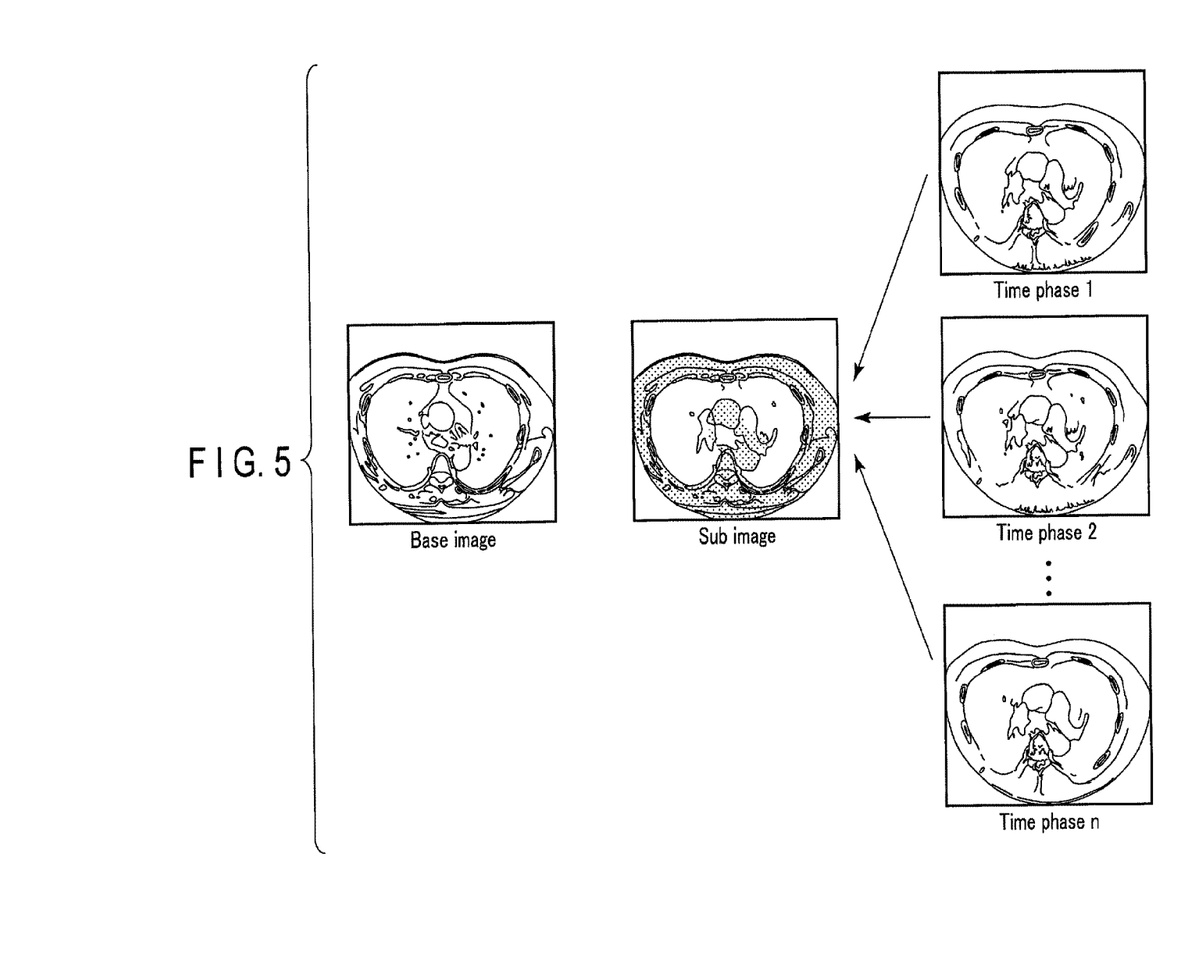
FIG. 5 is a diagram to explain functional images can be generated from a plurality of phase images.

FIG. 5 is a diagram to explain functional images can be generated from a plurality of phase images. In the field of the medical image processing technology, analyzing a plurality of time phase images (for example, CT images) allows to generate a functional image. Namely, it is possible to generate a functional image from a plurality of time phase images. In this case, because the functional image is generated after completion of positional adjustment among the plurality of time phase images, the positional alignment process of Step S13 of the flowchart shown in FIG. 2 may be omitted. Especially, in such case that the functional image and the morphological image are generated by using the same time phase as standard, the positional alignment process of Step S13 may be omitted.

In the case shown in FIG. 5, an example of generating a functional image on the basis of the CT images is explained. Instead of this, functional images can be generated from a plurality of time phase images by using other kind of medical images (for example, MR images or ultrasonic images and so on).

Figure 6:
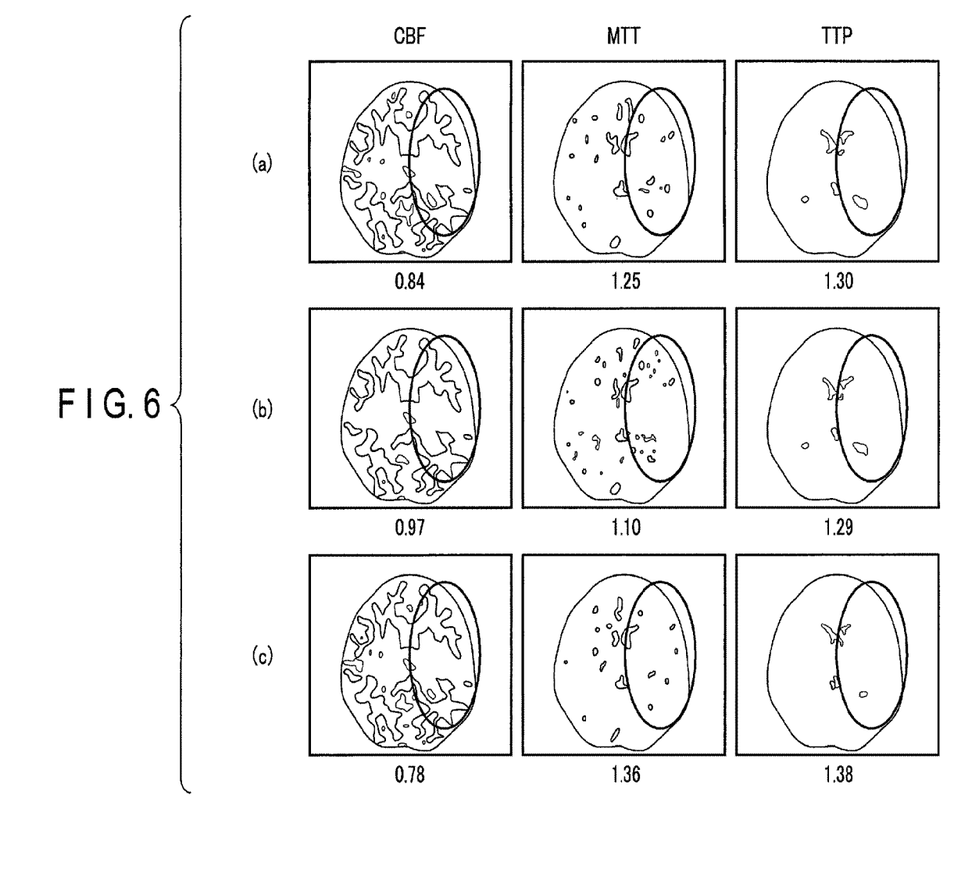
FIG. 6 is a diagram showing an example of a CT-perfusion (CTP) image.

FIG. 6 is a diagram showing an example of a CT-perfusion (CTP) image of a brain. In CTP, CT images for a plurality of time phases are generated by the continuous scan imaging performed while the first circulation of the travenous injected iodinated contrast medium in the brain. Because of the iodinated contrast medium cannot flow through the blood-brain barrier, a perfusion evaluation can be performed in the brain tissue capillary bed level. The CTP images generated by the above method can be called as an example of functional image generated with a plurality of time phase images.

FIG. 6(a) shows CTP images generated with continuous scanning. FIG. 6(b) and FIG. 6(c) show CTP images generated with intermittent scanning. Cerebral blood flow (CBF) images, perfusion maps of mean transit time (MTT) and perfusion maps of time to peak (TTP) are shown in FIG. 6.

In the embodiment, it is explained that the third determining function 260 determines the third parameters related to the base image in such a manner that the second parameter and the third parameter have a positive correlation. Alternately, the third determining function 260 may determine the third parameters related to the base image in such a manner that the second parameter and the third parameter have a negative correlation. Further, whether the positive correlation is applied or the negative correlation is applied may be switched on the basis of the kind of the second parameter (physical values shown in the pixels of the functional image). The negative correlation is intended to indicate that there is a opposite tendency between the two parameters.

That is, if one of them increases, the other decreases. Conversely, if one of them decreases, the other increases.

The modality is not limited to a PET/CT apparatus. Images obtained by an X-ray photography apparatus, an MRI system, a SPECT apparatus or other modalities can be processed in a similar manner. The kinds of images are not limited to a CT image or a PET image. A plain X-ray image, an MRI image, an ultrasonic diagnosis image, an angiographic image, an infrared topography apparatus image and a SPECT image may be used.

The term "processor" used in the above descriptions is, for example, a central processing unit (CPU) or a graphics processing unit (GPU), or may include the following types of circuit: an application-specific integrated circuit (ASIC), a programmable logic device (such as a simple programmable logic device (SPLD), or a complex programmable logic device (CPLD), a field programmable gate array (EPGA) or the like. The processor reads the programs stored in the storage circuit and executes them to realize the respective functions. The programs may be incorporated in the circuit of the processor, instead of storing them in the storage circuit. In this case, the processor reads the programs incorporated in its circuit and executes them to realize the respective functions. The processors described in connection with the above embodiments are not limited to single-circuit processors. A plurality of independent processors may be combined and integrated as one processor having multiple functions. Furthermore, a plurality of structural elements of each of the above embodiments may be integrated as one processor having multiple functions.

While certain embodiments have been described, these embodiments have been presented by way of example only, and are not intended to limit the scope. Indeed, the novel embodiments described herein may be embodied in a variety of other forms; furthermore, various omissions, substitutions and changes in the form of the embodiments described herein may be made without departing from the spirit. The accompanying claims and their equivalents are intended to cover such forms or modifications as would fall within the scope and spirit.

The invention claimed is:

1. A medical image processing apparatus, comprising:
a memory which stores a first image, which is a CT image obtained by capturing a target region of a subject, and a second image, which is a PET image obtained by capturing the target region;
processing circuitry configured to modify a first parameter of each pixel of the first image based on a second parameter of each corresponding pixel of the second image and based on a function of the second parameter, to generate a third parameter corresponding to each pixel, wherein the function includes a contribution ratio of the second image to the first image; and
a display which displays a display image based on the generated third parameter for each of the pixels, wherein
when the first parameter, the second parameter, and the third parameter represent opacities, the third parameter $O'_{CT}$ is defined as $$O'_{CT} = \begin{cases} f & (0 \le f \le 1) \\ 1 & (f > 1) \\ 0 & (f < 0) \end{cases}$$

where f is defined as $f(p,q,\alpha)=O_{CT}(p)-\alpha(1-O_{PET}(q))$ or $f(p,q,\alpha)=O_{CT}(p)\cdot\exp\{-\alpha(1-O_{PET}(q))\}$, and $O_{CT}(p)$ is the first parameter of the first image, and $O_{PET}(q)$ is the second parameter of the second image, and a is a contribution ratio; and when the first parameter, the second parameter, and the third parameter represent color values, the third parameter $E(C'_{CT})$ is defined as $$E(C'_{CT}) = \begin{cases} e & (0 \le e \le 255) \\ 255 & (e > 255) \\ 0 & (e < 0) \end{cases}$$

where e represents R element, G element, and B element, and is defined as $e(p,q,\beta)=E(C_{CT}(p))-\beta(255-E(C_{PET}(q)))$ or $e(p,q,\beta)=E(C_{CT}(p))\cdot\exp\{-\beta(255-(E_{PET}(q)))\}$, and $C_{CT}(p)$ is the first parameter of the first image, $C_{PET}(q)$ is the second parameter of the second image, $\beta$ is a contribution ratio.

2. The medical image processing apparatus according to claim 1, wherein:
the first image is a morphological image, and
the second image is a functional image.

3. The medical image processing apparatus according to claim 1, wherein:
the first parameter and the second parameter comprise at least one of pixel values including opacity and a color value.

4. The medical image processing apparatus according to claim 1, wherein:
the processing circuitry determines, for each pixel, the third parameter such that the third parameter and the second parameter have a positive correlation or a negative correlation.

5. The medical image processing apparatus according to claim 4, wherein:
the processing circuitry switches the positive correlation or the negative correlation based on a kind of physical values shown in the pixels of the second image.

6. The medical image processing apparatus according to claim 1, wherein:
the second image is a functional image generated from a plurality of time phase images.

7. The medical image processing apparatus according to claim 1, wherein the function includes the contribution ratio of the second image to the first image with respect to an opacity.

8. The medical image processing apparatus according to claim 1, wherein the function includes the contribution ratio of the second image to the first image with respect to a color value.

9. The medical image processing apparatus of claim 1, wherein the processing circuitry is further configured to receive a value of the contribution ratio, which is determined based on input by a user.

10. The medical image processing apparatus of claim 1, wherein each pixel of the display image is equal to a CT value of a corresponding pixel in the first image.

11. A medical image processing apparatus, comprising:
a memory which stores a first image, which is a CT image obtained by capturing a target region of a subject and a second image, which is a PET image obtained by capturing the target region;
processing circuitry configured to modify a first parameter of each pixel of the first image based on a second parameter of each corresponding pixel of the second image and based on a function of the second parameter, to generate a third parameter corresponding to each pixel, wherein the function includes a contribution ratio of the second image to the first image; and
a display which displays a display image in which a region corresponding to the subject of the first image is shown, by assigning the third parameter to each of the pixels generated by the processing circuitry, wherein
when the first parameter, the second parameter, and the third parameter represent opacities, the third parameter $O'_{CT}$ is defined as $$O'_{CT} = \begin{cases} f & (0 \le f \le 1) \\ 1 & (f > 1) \\ 0 & (f < 0) \end{cases}$$

where f is defined as $f(p,q,\alpha)=O_{CT}(p)-\alpha(1-O_{PET}(q))$ or $f(p,q,\alpha)=O_{CT}(P)\_\exp\{-\alpha(1-O_{PET}(q))\}$, and $O_{CT}(p)$ is the first parameter of the first image, and $O_{PET}(q)$ is the second parameter of the second image, and a is a contribution ratio; and when the first parameter, the second parameter, and the third parameter represent color values, the third parameter $E(C'_{CT})$ is defined as $$E(C'_{CT}) = \begin{cases} e & (0 \le e \le 255) \\ 255 & (e > 255) \\ 0 & (e < 0) \end{cases}$$

where e represents R element, G element, and B element, and is defined as $e(p,q,\beta)=E(C_{CT}(p))-\beta(255-E(C_{PET}(q)))$ or $e(p,q,\beta)=E(C_{CT}(p))\cdot\exp\{-\beta(255-(E_{PET}(q)))\}$, and $C_{CT}(p)$ is the first parameter of the first image, $C_{PET}(q)$ is the second parameter of the second image, $\beta$ is a contribution ratio.

12. A medical image processing method, comprising:
modifying a first parameter of each pixel of a first image, which is a CT image obtained by capturing a target region of a subject, based on a second parameter of each corresponding pixel of a second image, which is a PET image obtained by capturing the target region and based on a function of the second parameter, thereby generating a third parameter corresponding to each pixel, wherein the function includes a contribution ratio of the second image to the first image; and
displaying a display image based on the generated third parameter determined for each of the pixels, wherein
when the first parameter, the second parameter, and the third parameter represent opacities, the third parameter $O'_{CT}$ is defined as $$O'_{CT} = \begin{cases} f & (0 \le f \le 1) \\ 1 & (f > 1) \\ 0 & (f < 0) \end{cases}$$

where f is defined as $f(p,q,\alpha)=O_{CT}(p)-\alpha(1-O_{PET}(q))$ or $f(p,q,\alpha)=O_{CT}(p)\cdot\exp\{-\alpha(1-O_{PET}(q))\}$, and $O_{CT}(p)$ is the first parameter of the first image, and $O_{PET}(q)$ is the second parameter of the second image, and a is a contribution ratio; and when the first parameter, the second parameter, and the third parameter represent color values, the third parameter $E(C'_{CT})$ is defined as $$E(C'_{CT}) = \begin{cases} e & (0 \leq e \leq 255) \\ 255 & (e > 255) \\ 0 & (e < 0) \end{cases}$$

where e represents R element, G element, and B element, and is defined as $e(p,q,\beta)=E(C_{CT}(p)-\beta(255-E(C_{PET}(q)))$ or $e(p,q,\beta)=E(C_{CT}(p))\cdot\exp\{-\beta(255-(E_{PET}(q)))\}$, and $C_{CT}(p)$ is the first parameter of the first image, $C_{PET}(q)$ is the second parameter of the second image, $\beta$ is a contribution ratio.

13. A medical image diagnosis apparatus, comprising:
first processing circuitry configured to capture a first image, which is a CT image of a target region of a subject, and a second image, which is a PET image of the target region of the subject;
second processing circuitry configured to modify a first parameter of each pixel of the first image based on a second parameter of each corresponding pixel of the second image and based on a function of the second parameter, to generate a third parameter corresponding to each pixel, wherein the function includes a contribution ratio of the second image to the first image; and
a display which displays a display image based on the generated third parameter for each of the pixels, wherein when the first parameter, the second parameter, and the third parameter represent opacities, the third parameter $O'_{CT}$ is defined as $$O'_{CT} = \begin{cases} f & (0 \leq f \leq 1) \\ 1 & (f > 1) \\ 0 & (f < 0) \end{cases}$$

where f is defined as $f(p,q,\alpha)=O_{CT}(p)-\alpha(1-O_{PET}(q))$ or $f(p,q,\alpha)=O_{CT}(p)\cdot\exp\{-\alpha(1-O_{PET}(q))\}$, and $O_{CT}(p)$ is the first parameter of the first image, and $O_{PET}(q)$ is the second parameter of the second image, and a is a contribution ratio; and
when the first parameter, the second parameter, and the third parameter represent color values, the third parameter $E(C'_{CT})$ is defined as $$E(C'_{CT}) = \begin{cases} e & (0 \leq e \leq 255) \\ 255 & (e > 255) \\ 0 & (e < 0) \end{cases}$$

where e represents R element, G element, and B element, and is defined as $e(p,q,\beta)=E(C_{CT}(p))-\beta(255-E(C_{PET}(q)))$ or $e(p,q,\beta)=E(C_{CT}(p))\cdot\exp\{-\beta(255-(E_{PET}(q)))\}$, and $C_{CT}(p)$ is the first parameter of the first image, $C_{PET}(q)$ is the second parameter of the second image, $\beta$ is a contribution ratio.

* * * * *